Jan. 30, 1923.
F. F. ELLIS.
ANIMAL TRAP.
FILED JULY 15, 1922.
1,443,705.
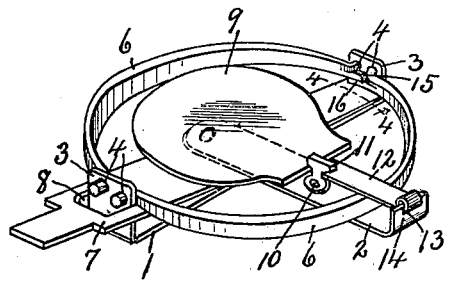
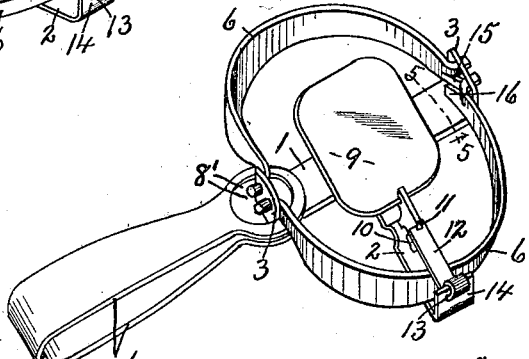
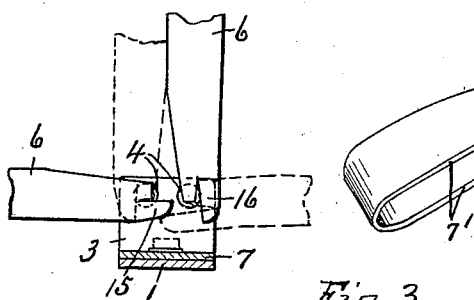
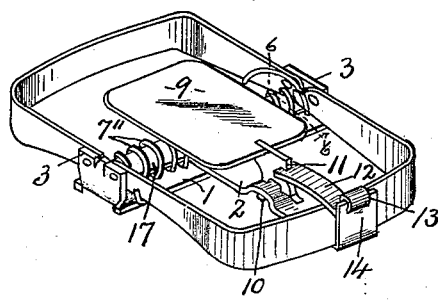
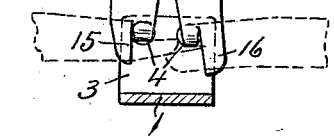
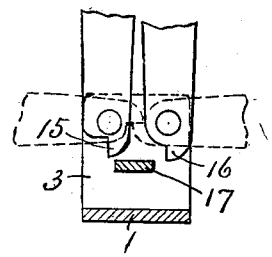
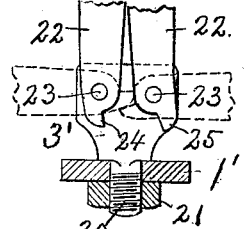
INVENTOR
F. F. Ellis
BY
Howard P. Denton
ATTORNEY.

Patented Jan. 30, 1923.

1,443,705

UNITED STATES PATENT OFFICE.

FERRAND F. ELLIS, OF ONEIDA, NEW YORK, ASSIGNOR TO ONEIDA COMMUNITY, LIMITED, OF ONEIDA, NEW YORK, A CORPORATION OF NEW YORK.

ANIMAL TRAP.

Application filed July 15, 1922. Serial No. 575,271.

*To all whom it may concern:*

Be it known that I, FERRAND F. ELLIS, of Oneida, in the county of Madison, in the State of New York, have invented new and useful Improvements in Animal Traps, of which the following, taken in connection with the accompanying drawings, is a full, clear, and exact description.

This invention relates to an animal trap involving the use of opposed spring-closed jaws pivoted to a suitable supporting base and adapted to be held in their open positions by means of a bait-pan and latch cooperating therewith, hinged to the frame and extending over the edge of one of the jaws for interlocking engagement with the heel of the bait-pan, in such manner that the slightest depression of the pan will trip it from interlocking engagement with the latch and thereby release the jaws to be closed by the retracting spring.

In this class of traps it has heretofore been customary to lock only one of the jaws in its open position by means of the latch and the bait-pan, leaving the other jaw free to swing toward and from the locked jaw, which, of course, is objectionable in that it frequently enables the animal to get at the bait on the pan from the underside of the loose jaw without liability of becoming caught, in case the jaws are released, by the tripping of the bait-pan.

The main object of my invention is to provide simple and efficient means, preferably as integral parts of the jaws, for holding the loose jaw in its open position when the other jaw is set and locked.

In other words, I have sought to provide means whereby the setting and locking of one of the jaws by the usual bait-pan and catch, will automatically lock the other jaw in its open position without in any way interfering with the free closing of both jaws by the retracting spring when the bait-pan is released from engagement with the catch, as for example, by the animal seeking the bait on the pan. Other objects and uses relating to specific parts of the device will be brought out in the following description:

In the drawings:

Figures 1, 2 and 3 are perspective views of modified forms of traps equipped with my improved locking device.

Figures 4, 5 and 6 are enlarged detailed sectional views taken respectively on lines 4—4 Figure 1, 5—5 Figure 2, and 6—6 Figure 3, showing the interlocking connections between the jaws of the several traps shown in Figures 1, 2 and 3.

Figure 7 is a detail sectional view of one side of a modified form of jaw support with which my invention may be used.

In Figure 1 is shown a frame consisting of a base-plate, or bottom —1—, and a cross-bar —2—, secured at one end by spot welding or equivalent fastening means to the central portion of the base-plate —1— and having its other end extending laterally from the base-plate a distance somewhat greater than the radius of either jaw.

The ends of the base plate —1— are provided with upturned ears or lugs —3— having apertures —4— for receiving the ends of a pair of opposed jaws —6—. A flat spring —7— extends lengthwise of and directly over the base plate —1— and is secured in any suitable manner to one end of said base plate and has its other end extended some distance beyond the corresponding end of the base plate and provided with an opening —8— for receiving the adjacent upturned flange or lug —3—, when the jaws are open, and also for receiving the adjacent ends of the jaws when the latter are closed.

The opposite longitudinal walls of the opening —8— serve to engage the lower or outer edges of the adjacent ends of the jaws to effect the closing of the same from their open or set positions when released, it being understood that the spring —7— is placed under tension by the opening of the jaws.

A bait-pan —9— extends across the upper face of the spring —7— transversely of the plate —1—, and is held within the arcs of movement of the jaws —6—, and is pivoted at one end at —10— to the cross bar —2— at one side of the base plate —1— and between said base plate and the adjacent jaw —6— when the latter is open.

The hinged end of the bait-pan —9— is provided with a shoulder —11— adapted to be engaged by catch —12— which is pivoted at its outer end at —13— to an upturned flange —14— on the outer end of the cross-bar, just at the outside of the adjacent open jaw —6— and is adapted to engage the upper edge of said jaw to hold it in its open position when the catch is engaged with the shoulder —11— on the bait-pan, as shown in Figure —1—.

The jaws —6— are provided at one and the same end, preferably opposite that engaged by the free end of the spring —7—, with extension shoulders —15— and —16— adapted to overlap one upon the other when the jaws are opened for locking the loose jaw in its open position, when the opposite jaw is set in its open position by the interlocking engagement of the bait-pan —9— with the catch —12—.

When the trap is set, these shoulders —15— and —16— engage each other at a point between the adjacent pivotal pintles of the jaws in such manner that the shoulder or tongue —15— lies directly over and against the shoulder or tongue —16— and it therefore follows that if the jaw having the shoulder —16— is locked in its open position by the latch —12—, the other jaw will also be locked in its open position by its tongue —15— with the tongue —16—.

On the other hand, if the bait-pin —9— is tripped by an animal or other pressure from locking engagement with its catch —12—, the jaws —6— will be instantly closed by the action of the spring —7—.

In setting the jaws, the one having the shoulder, or tongue —15—, is opened slightly in advance of the opening of the other jaw, to enable the tongue —16— of the last named jaw to ride under the tongue —15— of the first named jaw, after which the latch —12— and bait-pan —9— are moved by hand into interlocking engagement to hold the jaws against the action of the spring —7—.

The device shown in Figure 2 is quite similar to that shown in Figure 1, except in the employment of a U-shaped leaf spring —7′—, having the free ends of its opposed arms provided with openings —8′— for receiving the adjacent lug or flange —3— around which the spring —7′— is adapted to turn to different angles, relatively to the base plate —1—, the free end of the lower arm resting upon the base plate, while the upper arm is placed under tension by the opening of the jaws, and operates by its own tension to close the jaws when the bait-pan —9— and catch —12— are released from interlocking engagement. Otherwise, the interlocking connections —15— and —16— between the jaws, are similar to those previously described.

The construction shown in Figure 3 is also somewhat similar to that shown in Figures 1 and 2, except that the jaws are operated by a coil spring —7″—, extending along and above the base plate —1—, and held in place by a rod or bar —17— which extends lengthwise through the coil and has its ends secured in the upstanding lugs or flanges —3— on the ends of the base plate —1—, the opposite ends of the spring being engaged with the lower edges of the adjacent ends of the opposite jaws, so as to exert substantially equal closing pressure upon both of the jaws simultaneously.

In Figure 7 the jaw supporting lugs as —3′— are made separate from the base as —1′— but are provided with reduced threaded ends —20— secured in apertures in the base by nuts —21—, the jaws as —22— being pivoted to the lugs by rivets —23— and are provided with extensions —24— and —25—, adapted to interlock one upon the other to cause the pan-locked jaw to hold the other jaw against closing when both jaws are fully opened.

What I claim is:

1. In combination with spring-closed jaws of an animal trap, means for locking one of the jaws in its open position, and co-operative shoulders on said jaws, over-lapping one upon the other when the jaws are open, to hold the other jaw against closing, while the first named jaw is open.

2. An animal trap comprising a base plate having upturned ears, opposite jaws pivoted to said ears, a cross bar secured to the base plate and extending beyond one of the jaws when opened, a bait-pan and latch pivoted to the cross-bar and engaging one of the jaws to hold the same in its open position, a spring for closing the jaws when the bait-pan and latch are released from engagement one with the other, and co-operative means on the adjacent ends of one of the jaws for locking the other jaw in its open position.

In witness whereof I have hereunto set my hand this 8th day of July, 1922.

FERRAND F. ELLIS.

Witnesses:
B. W. BARRON,
E. M. SANTRY.